US008726226B2

(12) United States Patent
Groves et al.

(10) Patent No.: US 8,726,226 B2
(45) Date of Patent: May 13, 2014

(54) INTEGRATED WORK LISTS FOR ENGINEERING PROJECT CHANGE MANAGEMENT

(75) Inventors: Mark Groves, Monroe, WA (US); Jens Jacobsen, Seattle, WA (US); Suhail Dutta, Kirkland, WA (US); Tracey Glass Trewin, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 12/479,135

(22) Filed: Jun. 5, 2009

(65) Prior Publication Data

US 2010/0313179 A1 Dec. 9, 2010

(51) Int. Cl.
*G06F 9/44* (2006.01)
*G06F 9/45* (2006.01)

(52) U.S. Cl.
USPC .......... 717/101; 717/120; 717/170; 717/159; 717/154; 717/113; 717/104; 717/105; 717/107; 717/109

(58) Field of Classification Search
CPC .......... G06Q 10/06; G06Q 10/10; G06F 8/20; G06F 8/71; G06F 8/10; G06F 9/46; G06F 9/44; G06F 8/65; G06F 8/67; G06F 8/68; G06F 8/61
USPC ......................................... 717/101, 104–105
See application file for complete search history.

(56) References Cited

U.S. PATENT DOCUMENTS 5,490,097 A * 2/1996 Swenson et al. ................... 703/2
5,826,252 A * 10/1998 Wolters et al. ................. 717/101
6,298,319 B1 * 10/2001 Heile et al. ....................... 703/26
6,405,364 B1 * 6/2002 Bowman-Amuah .......... 717/101
6,519,763 B1 * 2/2003 Kaufer et al. ................. 717/101
7,047,518 B2 5/2006 Little et al.
7,071,934 B1 * 7/2006 Faoro et al. .................... 715/229
7,139,999 B2 11/2006 Bowman-Amuah
7,370,315 B1 5/2008 Lovell et al.
7,370,318 B1 * 5/2008 Howe et al. .................... 717/110
2002/0116702 A1 * 8/2002 Aptus et al. .................... 717/170
2005/0114830 A1 * 5/2005 Knutson et al. ............... 717/102

(Continued)

OTHER PUBLICATIONS

Akhil Mehra, John Grundy, John Hosking. "A Generic Approach to Supporting Diagram Differencing and Merging for Collaborative Design". ASE'05 Proceedings of the 20th IEEE/ACM international Conference on Automated software engineering. Nov. 7-11, 2005. pp. 204-213.*

(Continued)

*Primary Examiner* — Lewis A Bullock, Jr.
*Assistant Examiner* — Keith C Yuen
(74) *Attorney, Agent, or Firm* — Kevin Sullivan; Kate Drakos; Micky Minhas

(57) ABSTRACT

A tool supports management of engineering project changes using a current design diagram with links to implementation components, a proposed design diagram, and a work list of tasks for transforming the current design into the proposed design. Tasks recite intended changes such as add, remove, or refactor, with reference to implementation components to be changed, and tracking information. Work list tasks may be automatically generated based on design model differences correlated with project code, automatically generated based on tracked user design actions correlated with project code, and/or manually generated by users. Work lists may be exported. Users can mark a relationship for removal and view a corresponding updated work list. Users can trace impact of a work list on project context such as testing coverage, database structures, and user scenarios.

20 Claims, 3 Drawing Sheets

(56) References Cited

U.S. PATENT DOCUMENTS

| | | | | |
|---|---|---|---|---|
| 2005/0160103 | A1* | 7/2005 | Raffo | 707/100 |
| 2005/0257136 | A1* | 11/2005 | Charisius et al. | 715/511 |
| 2007/0174101 | A1* | 7/2007 | Li et al. | 705/8 |
| 2008/0066072 | A1* | 3/2008 | Yurekli et al. | 718/104 |
| 2008/0098360 | A1 | 4/2008 | Klinger et al. | |
| 2008/0313595 | A1* | 12/2008 | Boulineau et al. | 717/101 |
| 2009/0006147 | A1* | 1/2009 | Padmanabhan | 705/7 |
| 2009/0019426 | A1* | 1/2009 | Baeumer et al. | 717/122 |
| 2009/0083696 | A1* | 3/2009 | Blackburn | 717/104 |
| 2010/0064277 | A1* | 3/2010 | Baird et al. | 717/120 |

OTHER PUBLICATIONS

"Source Code Analysis", "Imagix", retrieved at <<http://www.imagix.com/products/program_comprehension.html>>, Apr. 23, 2008, p. 1.

"PowerDesigner", "Sybase UK Ltd", retrieved at http://www.qbssoftware.com/product_info.aspx?current=DETAILEDINFO&product=PDESIGN#2>>, Apr. 23, 2008, pp. 4.

Huang, Shihong, "Assessing Software Process Hotspots via Analysis and Visualiation of Software Repository Data", "Journal of Engineering, Computing and Architecture vol. 2", retrieved at http://www.scientificjournals.org/journals2008/articles/1380.pdf>>, 2008, pp. 12.

"Visual Studio Team System 2010 Overview", retrieved at <<http://msdn.microsoft.com/en-us/vstudio/bb725993.aspx>>, Apr. 23, 2008, pp. 3.

Sundman, Joel, "Impact Analysis with Rational Architecture Management Tools", retrieved at http://www.ibm.com/developerworks/rational/library/apr07/sundman/index.html>>, Apr. 15, 2007, pp. 10.

"Lattix: Getting Started", retrieved at <<http://lattix.com/dl/gettingstarted.php>>, pp. 3, 2005-2009.

Sangal, Neeraj, "Using Dependency Models to Manage Complex Software Architecture", retrieved at <<sdg.csall.mit.edu/pubs/2005/oopsla05-dsm.pdf>>, 2005, pp. 10.

* cited by examiner

INTEGRATED WORK LISTS FOR ENGINEERING PROJECT CHANGE MANAGEMENT

BACKGROUND

Project management involves assessing, planning, organizing, tracking, and otherwise managing resources to achieve specific project goals. Project management may thus include identifying, assigning, testing, and otherwise managing specific changes to software, hardware, business processes, personnel, and other resources. Feasibility assessment may be part of project management. Time, functional requirements, budget, and other constraints often shape project management plans and results. Project management of changes in an existing system is sometimes referred to as change management.

SUMMARY

Some projects can benefit from tools and techniques to capture, communicate and track the work involved in making an intended architectural change. Three aspects of change may be managed together: an understanding of an existing solution's design, a proposed design, and work required to go from the existing design to the proposed design. Some embodiments described herein provide a current design diagram representing a current design of an engineering project, with links between design elements and implementation components. A proposed design diagram represents a proposed design of the project and is versioned separately from the current design diagram. A work list of tasks for transforming the current design into the proposed design is also provided. Each task has a change category summarizing an intended change such as add, remove, or refactor, and a reference to an implementation component or a design element which is to be changed as indicated in the change category. Tasks may include tracking information such as a status and an owner. Work list tasks may be automatically generated based on design model differences correlated with project code, automatically generated based on tracked user design actions correlated with project code, and/or manually generated by users. Some embodiments export work list tasks to a work tracking tool.

With some embodiments, users can manage changes in an engineering project by viewing and editing a current design diagram in a modeling language such as Unified Modeling Language (UML), by viewing and editing a proposed design diagram, by viewing details of a dependency between software source code implementation components (e.g., class, caller, type, called), and by viewing and editing a work list of tasks for transforming the current design into the proposed design. With some embodiments, users can mark a dependency for removal and view a corresponding updated work list. With some, users can compare a pre-removal dependency call list with a post-removal dependency call list, thereby assessing progress. With some embodiments, users can trace impact of a work list task on project context items such as testing coverage, database structures, and user requirements such as those illustrated in user scenarios.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
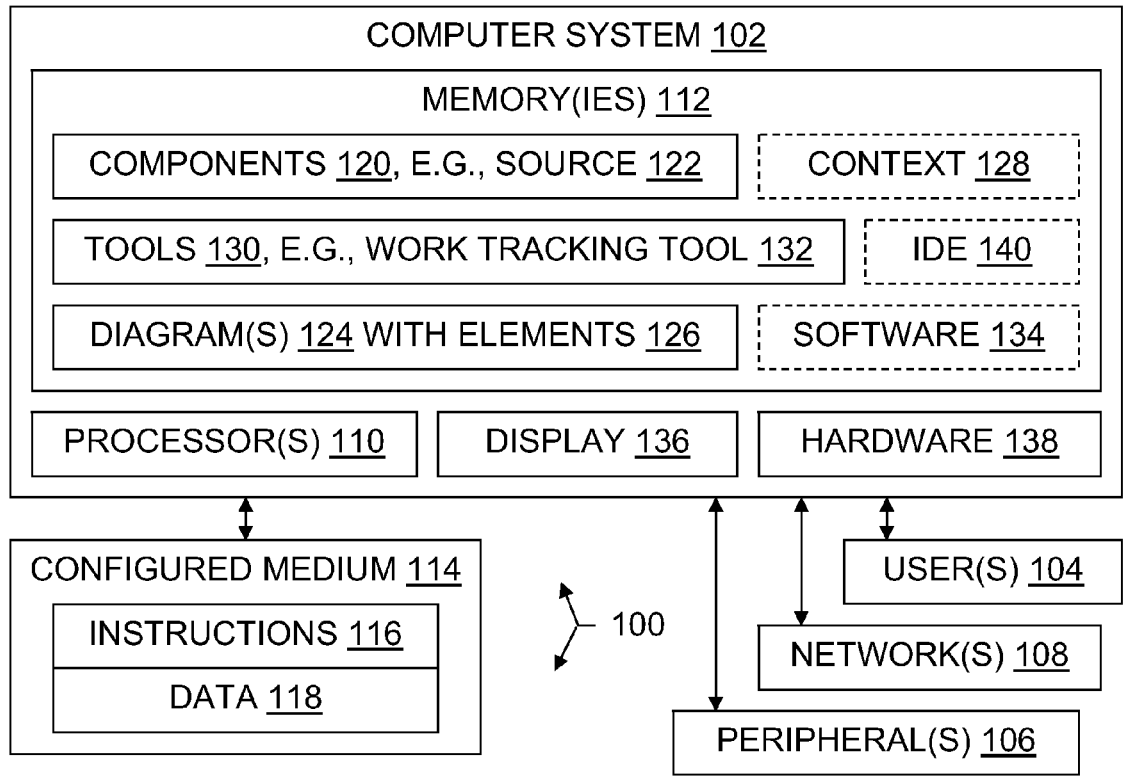
FIG. 1 is a block diagram illustrating a computer system having at least one processor, at least one memory, components of an engineering project, at least one diagram representing the components, and other items in an operating environment which may be present on multiple network nodes, and also illustrating configured storage medium embodiments.

Many software engineering projects involve adding to or modifying existing software implementations to support changing business requirements. Determining the scope of the changes needed to the software system can be very challenging. Architectural refactoring to improve system stability and flexibility may also be difficult for businesses to address, given inadequate knowledge of the work involved and of the progress of such work.

Some familiar tools facilitate a user's ability to understand a current software implementation. Some tools help their users design changes to existing systems. Some familiar tools let a user reverse engineer code and translate simple relationships between elements into design diagrams, which can then be updated and used in simple cases to generate software code reflecting the updates. However, in many cases such an approach is impractical; desired code changes are too complicated to be automatically generated from a modeling tool, and direct human involvement is needed to implement the changes. Accordingly, some familiar tools are practical only in limited domains within narrow constraints.

Some embodiments described herein provide allow users to effectively capture, communicate, and track the work involved in making an intended architectural change. Some embodiments make it relatively easy for a user to correlate and integrate three aspects of change: an understanding of the existing solution, a proposed design, and the work required to go from the existing solution to an implementation of the proposed design.

In some embodiments, design diagrams populated through reverse engineering of code can show complex and simple relationships. The diagrams can be supplemented to express design intent, such as adding or removing dependencies, adding or removing code elements, and so on, using a work list that reflects the changes to code components. Work list tasks can be used directly for tracking, can be associated with bugs, and can allow tracking of the work and navigation from work items to the project context, in the model and in code, for intended changes.

Some embodiments promote understanding, communicating, and managing architectural change. For example, in some embodiments architectural diagrams re-engineered from code can be used to express design intent by adding, deleting and changing elements, which is then used to generate a detailed work list of the code which is affected by the intended design. The work list is persisted together with the model. Items in the work list can be associated with work items such as tasks or bugs, to communicate, organize and track the intended work. Users can navigate from work items back to modeling context, including diagrams, with the analysis and the code elements linked. A user can use a diagram that is re-engineered from code to express design intent and communicate clearly which parts of the diagram represent existing elements, and which represent intended changes. A work list can include code changes, as well as analysis of testing impact and impact on database design and other parts of the system being analyzed.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

An "engineering project" is a project which involves changes to software, hardware, testing, and/or other engineered elements.

Throughout this document, use of the optional plural "(s)" means that one or more of the indicated feature is present. For example, "design element(s)" means "one or more design elements" or equivalently "at least one design element".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as people, hardware, product characteristics, inventories, physical measurements, settings, images, readings, targets, volumes, and so forth. Such data is also transformed by as discussed herein, e.g., by correlating, linking, exporting, execution, modification, display, creation, loading, and/or other operations.

Memories 112 may be of different physical types. Aspects of a system being changed may include components 120, such as source code 122, documented in model diagram(s) 124 which have elements 126 representing the components. Changes to components 120 may impact other parts of a project's context 128, such as user requirements, data structures in databases or other applications, and test requirements. Familiar tools 130 may be used to document and/or perform changes, such as work tracking tools 132, as well as compilers, debuggers, version control systems, and project management solutions such as Microsoft® Office Project Server™ software. Kernels, tools, and other software 134, and other items shown in the Figures may reside partially or entirely within one or more memories 112, thereby configuring those memories. An operating environment may also include visual display(s) 136, and other hardware 138, such as buses, power supplies, and accelerators, for instance.

A given operating environment 100 may include an Integrated Development Environment (IDE) 140 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
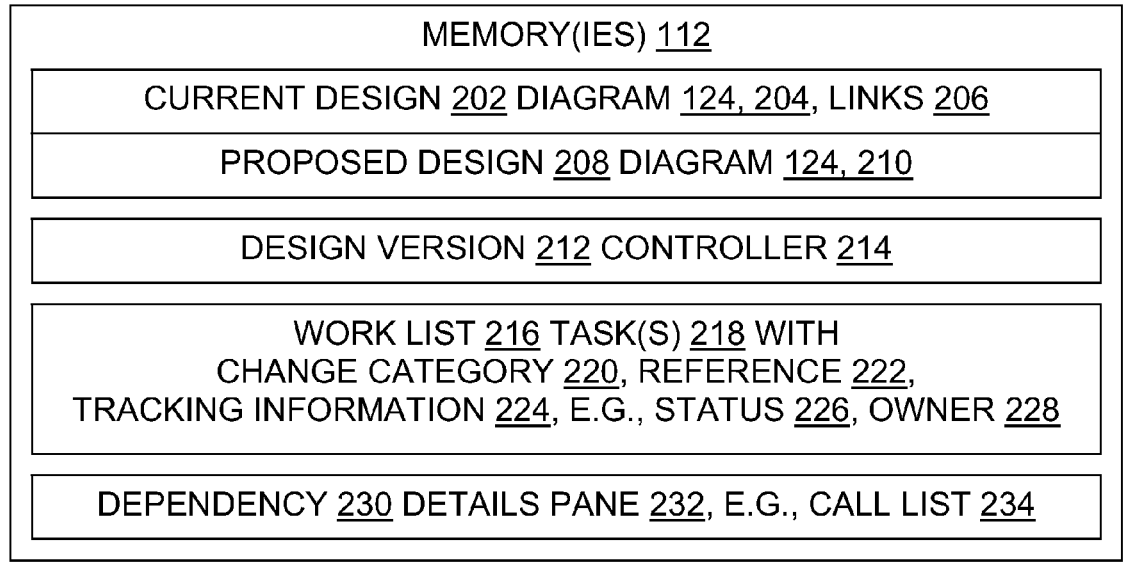
FIG. 2 is a block diagram illustrating project change management tools in an example architecture.

FIG. 2 illustrates an architecture which is suitable for use with some embodiments. A current design 202 of an engineering project is at least partially documented in a current design diagram 204. In some embodiments, the current design diagram 204 includes a visualized modeling language diagram 124, such as a Unified Modeling Language diagram, enhanced as discussed herein. In particular, the diagram 204 may include as an enhancement links 206 between design diagram elements 126 and project implementation components 120 and work lists. A proposed design 208 of the project is at least partially documented in a proposed design diagram 210. The proposed design diagram 210 may be a diagram 124, which in some embodiments is enhanced with links 206 between design diagram elements 126 and project implementation components 120 and work lists.

In some embodiments, the current design diagram 204, the proposed design diagram 210, or both, are version controlled. A version controlled design has a design version 212 which is assigned, checked, and updated by a version controller 214. Familiar model version control systems can be used as version controllers 214 when suitably adapted for use with design diagram(s) 204, 210. For instance, adaption may include correlating a current design diagram 204 with corresponding proposed design diagram(s) 210 during versioning, and/or versioning link(s) 206.

Some embodiments provide a work list 216, such as a list of tasks 218 to be performed to bring the actual (current) design closer to the proposed design. In one embodiment, for example, each work list task 218 includes a change category 220 identifying the kind of change(s) to be made to component(s) 120 which are also identified in the task 218 by one or more references 222, such as handles, GUIDs, or the like. References 222 may operate as navigable links during use of an embodiment. In some embodiments, tasks 218 also include tracking information 224 such as a current status 226 of the task and one or more task owners 228, e.g., the responsible manager, responsible developer, and so on.

In some embodiments, references 222 can be used to obtain information about existing components 120, and in particular, information about dependencies between components 120 and other relationships, such as inheritance and association. A dependency details pane 232 or other display mechanism can be navigated to display dependency details such as call lists 234, and an expression within the class which depends on another component for all or part of its execution.

With reference to FIGS. 1 and 2, some embodiments provide a computer system 102 with a logical processor 110, a display 136, and a memory 112 configured by circuitry, firmware, and/or software to transform project designs and components as described herein. For example, in some embodiments implementation components 120 encode in a portion of the memory 112 implementation details of a current implementation of an engineering project. A current design diagram 204 in a portion of the memory represents a current design 202 of the engineering project. The current design diagram includes design elements 126 which have a visual representation in the display device. Each of the design elements of interest also has a link 206 to at least one implementation component 120. A proposed design diagram 210 in a portion of the memory represents a proposed design 208 of the project, and in some embodiments is versioned separately from the current design diagram rather than being an integral part of the current design diagram. In some embodiments, the current design and the proposed design can be expressed in the same diagram, versioned separately in some embodiments and versioned together in other embodiments. A work list 216 in a portion of the memory includes tasks 218 for transforming the current design into the proposed design.

In some embodiments, a task 218 of the work list 216 includes a change category 220 summarizing an intended change to be made to the current design. The task 218 also includes a reference 222 to an implementation component 120 which is to be changed as indicated in the change category, to a design element 126 which is to be changed as indicated in the change category, or to both component(s) and design element(s). In some embodiments, the change category 220 indicates that at least one of the following should be done with an implementation component 120: remove, refactor, add. Refactor specifics may be indicated, in terms of one or more patterns, for example. The implementation component 120 to be changed may include at least one of the following: software component, namespace, project, assembly, class, method, call, block of code, line of code.

In some embodiments, the task 218 further includes tracking information 224 containing at least one of the following: task status 226 (e.g., unassigned, assigned, underway, tested, completed), task owner 228.

In some embodiments, the implementation components 120 include at least one of: a software source code component, a hardware circuit diagram.

In some embodiments, the design elements 126 include Unified Modeling Language model diagram elements. Other modeling languages may also be used, in some embodiments.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Methods

Figure 3:
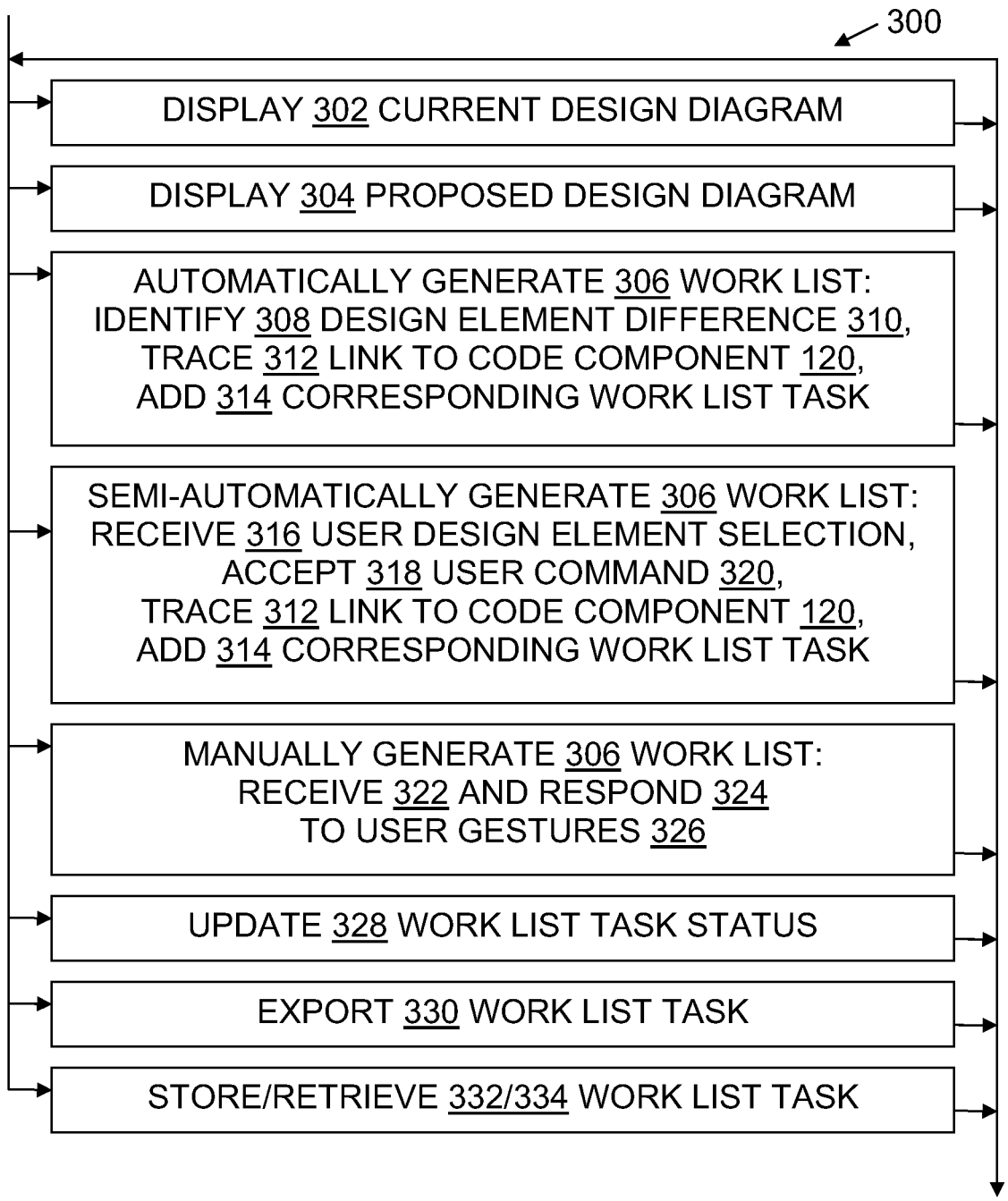
FIG. 3 is a flow chart illustrating steps of some method and configured storage medium embodiments from a system tool perspective.
Figure 4:
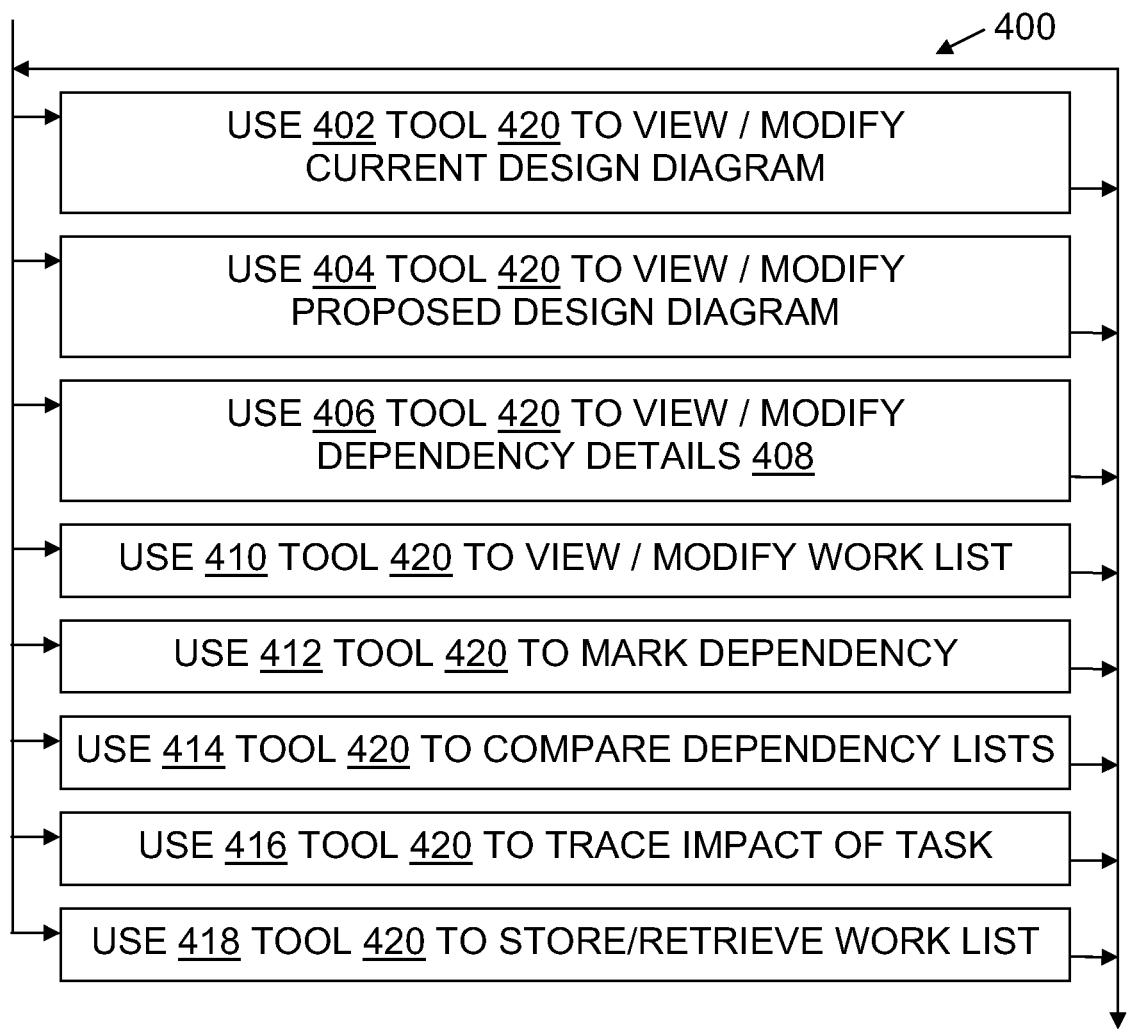
FIG. 4 is a flow chart illustrating steps of some method and configured storage medium embodiments from a user perspective.

FIGS. 3 and 4 each illustrate some method embodiments in respective flowcharts 300 and 400. FIG. 3 shows steps from a system's point of view, while FIG. 4 shows steps from a system user's point of view. A given method may include steps from either or both of these Figures, and it will be understood that a step in one Figure may have corresponding step(s) in the other Figure, since the Figures are from different points of view but both pertain to embodiments for engineering project change management as discussed herein. Methods shown in the Figures may be performed in some embodiments automatically, e.g., by a tool that generates work lists 216 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in the Figures. Steps may be performed serially, in a partially overlapping manner, or fully in parallel. The order in which flowchart(s) of the Figure(s) are traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a current design diagram displaying step 302, an embodiment displays a current design diagram 204 on a display 136. Step 302 may be accomplished for example by using graphical user interfaces and/or other familiar tools, adapted for displaying links 206 and for allowing navigation through links 206 between design elements 126 of current and proposed designs, components 120, and work list tasks 218.

During a proposed design diagram displaying step 304, an embodiment displays a proposed design diagram 210 on a display 136. Step 304 may be accomplished by using mechanisms used for current design diagram displaying step 302, for example.

During a work list generating step 306, one or more items of a work list 216 are automatically and/or manually generated. FIG. 3 shows examples of three approaches for accomplishing step 306. Some embodiments use only one of these approaches, while other embodiments support two of the approaches or all three approaches.

One approach automatically generates 306 work list task(s) 218. An embodiment automatically identifies 308 design element difference(s) 310 between a current design diagram 204 and a proposed design diagram 210, e.g., by traversing each diagram and identifying design element(s) 126 which appear in one diagram but not in the other, or which appear in both diagrams but have different link(s) 206 and/or different connection(s) to surrounding design element(s) 126 in one diagram than in the other diagram. The link(s) 206 implicated in the design element difference(s) 310 are automatically traced 312 to their respective component(s) 120. Task(s) 218 are automatically created accordingly and added 314 to the work list 216. For example, if a current design diagram Alpha contains a design element D with links to components C1 and C2, and a proposed design diagram Beta contains element D with only a link to component C3, then tasks are added 314 to remove C1, to remove C2, and to add C3.

A second approach semi-automatically generates 306 work list task(s) 218. An embodiment receives 316 a user 104 selection of design element(s) 126 of a design diagram 204 or 210, and accepts 318 a user command 320 applicable to the selected design element(s). The link(s) 206 implicated in the design element(s) and in the command are automatically traced 312 to their respective component(s) 120. Task(s) 218 are automatically created accordingly and added 314 to the work list 216. For example, if a user deletes a selected element 126 from a current design diagram, and the selected element has a link to component C1, then a task is added 314 to remove C1. Similarly, if a user inserts a selected element 126 in a proposed design diagram, then a task is added 314 to add C2.

A third approach manually generates 306 work list task(s) 218. An embodiment receives 322 task data (e.g., link(s) 206, design element 126 selection) through a graphical user input or other interface from a user 104, and responds 324 by creating/updating a task 218 accordingly. In a variation, a user selects an item and adds a generic (e.g., template format) task. This variation may be viewed as a hybrid of the second approach and the third approach. Some embodiments receive 322 task data input by user gestures 326 such as mouse and keyboard movements, some embodiments receive 322 task data through an Application Program Interface (API), and some do both.

During a work list task status updating step 328, an embodiment updates a task 218 status 226, e.g., by changing an enumeration value in response to a user gesture.

During a work list task exporting step 330, an embodiment exports a copy of one or more tasks 218 for subsequent use by another tool, e.g., by writing task data to a file, to a data stream, to a network connection, to a shared memory 112 buffer, or by another mechanism, in a format recognized by the intended recipient. In some embodiments, data travels in a round trip, namely, links between work list items and work items are established, and updates can flow both ways.

During a work list task storing step 332, an embodiment stores a copy of one or more tasks 218 in a persistent memory, e.g., by writing task data to a file, to a data stream, or to a network connection, or by another data storage mechanism.

During a work list task retrieving step 334, an embodiment retrieves a copy one or more tasks 218 from a persistent memory, e.g., by reading task data from a file, from a data stream, or from a network connection, or by another data retrieval mechanism.

During a current design diagram viewing step 402, also referred to as using step 402, a user uses a tool 420 to view at least a portion of a current design diagram 204 in a display device. The tool 420 may be an embodiment of method(s) illustrated by FIG. 3, for example. The tool 420 may include a graphical user interface (GUI), and logic/circuitry for displaying, modifying, storing, retrieving, navigating, and otherwise managing design diagrams 204, 210, work lists 216, and other items illustrated by FIG. 2, for example.

During a proposed design diagram viewing step 404, also referred to as using step 404, a user uses a tool 420 to view at least a portion of a proposed design diagram 210 in a display device.

During a dependency detail viewing step 406, also referred to as using step 406, a user uses a tool 420 to view one or more design diagram element 126 dependency 230 details in a display device, such as call lists 234 enumerating dependencies between components 120 represented by elements 126. Dependency details may be viewed 406 when they are displayed in a pane 232 or other graphical user interface device, for example.

During a work list viewing step 410, also referred to as using step 410, a user uses a tool 420 to view at least a portion of a work list 216 in a display device.

During a dependency marking step 412, also referred to as using step 412 or relationship marking step 412, a user uses a tool 420 to mark a dependency 230 or other relationship (e.g., association, inheritance) in a current design diagram for removal from the design, that is, for exclusion from a proposed design diagram 210. A mouse movement and/or other user gesture may be used to select and mark the dependency or other relationship.

During a dependency list comparing step 414, also referred to as using step 414, a user uses a tool 420 to compare two dependency lists, which may be shown separately or together in a display device. In particular, the user may compare 414 a current design diagram dependency call list with a corresponding proposed design diagram dependency call list to determine whether the current design has reached the desired call list. Similarly, a user may compare 414 two versions of a current design diagram dependency call list from different points in time to determine whether changes have been made yet to move the current design toward a desired call list. For example, one could track progress toward the proposed design code gets changed. One might have twenty items in the work list for a certain dependency starting out, but after having done some work, have only five items left in the work list. More generally, embodiments may help users see how much work is done, and how much work remains to do.

During an impact tracing step 416, also referred to as using step 416, a user uses a tool 420 to help trace the impact of a proposed design on project context 128. For example, in some embodiments a user may use to tool while navigating from a work list task 218 to component(s) 120 to test cases and schedules used for testing those components, to help the user determine whether an added component is scheduled for testing, and if so, what aspects of the component will be tested. In some embodiments, the work required on test, database, and/or user requirements can themselves be captured as elements in the work list. In some embodiments, work list items are generated during such navigation, as discussed in examples herein.

During a work list storing-retrieving step 418, also referred to as using step 418, a user uses a tool 420 to store at least a portion of a work list 216 in a persistent memory 112 or to retrieve at least a portion of a work list 216 from a persistent memory 112.

The foregoing steps and their interrelationships are discussed in greater detail below, in connection with various embodiments.

Some embodiments provide a method for managing changes in an engineering project. The method includes displaying 302 a current design diagram 204 in a computer system display device to represent a current design of an engineering project. The current design diagram includes design elements 126 having a visual representation in the display 136. Each design element also has a link 206 to at least one implementation component 120. In some embodiments, diagrams show a mix of current and proposed design, so some design elements do not have a link to an implementation component. The method also includes displaying 304 a proposed design diagram in the display device to represent a proposed design of the project, with the proposed design diagram including at least one proposed design element not present in the current design diagram. The method also includes generating 306 a work list 216 in a computer system memory 112. The work list includes one or more tasks 218 for transforming the current design into the proposed design, such as by refactoring.

In some embodiments, the generating step 306 includes automatically identifying 308 a design element difference 310 between the current design diagram and the proposed design diagram, automatically tracing 312 a link for the design element difference to a software source code implementation component 120, and automatically adding 314 a work list task 218 which has a change category 220 based at least on the design element difference and which also has a reference 222 to the software source code implementation component. Thus, the work list task 218 is based in this event on model differences correlated with project code.

In some embodiments, the generating step 306 includes receiving 316 a user selection of a design element of the current design diagram, accepting 318 a user command 320 to alter the selected design element, automatically tracing 312 a link for the design element to a software source code implementation component 120, and automatically adding 314 a work list task which has a change category 220 based at least on the user command and also has a reference 222 to the software source code implementation component. Thus, the work list task 218 is based in this event on tracked user design actions correlated with project code.

In some embodiments, the generating step 306 includes receiving 322 user gestures through a GUI, API, and/or other interface and responding 324 by adding 314 the work list task 218. Thus, the task 218 is added manually in this event.

In any of the foregoing examples, the generating step 306 may include allocating and/or initializing a work list task status 226. The method may then further include updating 328 the status in response to a user action, which may be direct (e.g., selecting a status from a displayed list) or indirect (e.g., checking a component out of a version control system could change task status from "assigned" to "underway") with regard to a task status variable.

In some embodiments, the method further includes exporting 330 at least one work list task 218 to a work tracking tool 132 which did not generate the work list task(s) being exported. Exporting 330 may involve copying to persistent memory, but need not do so in every case. By contrast, in the same and/or other embodiments, the method includes storing 332 in a persistent memory a work list task. A stored task 218, like an exported task 218, may include at least one or more of the following: a change category, a reference to a software source code implementation component which is to be changed as indicated in the change category, a status, a task owner.

Some embodiments provide a method for using a tool 420 for managing changes in an engineering project. The method includes using 402 the tool to view a current design diagram in a computer system display device, with the current design diagram representing a current design of an engineering project by design elements having a visual representation in the display, and each design elements also having a link 206 to at least one implementation component 120. The method also includes using 404 the tool to modify a proposed design diagram in the display device, with the proposed design diagram representing a proposed design of the project. The proposed design diagram includes at least one proposed design element (having a visual representation in the display device) that is not present in the current design diagram. The method also includes using 406 the tool to view at least one of the following details 408 of a dependency between software source code implementation components: caller, type, called. The method also includes using 410 the tool to view a work list in the display device. The work list includes tasks 218 for transforming the current design into the proposed design of the engineering project. A task of the work list has a change category 220 summarizing an intended change to be made to the current design, and a reference 222 to a software source code implementation component 120 which is to be changed as indicated in the change category.

In some embodiments, the method also includes using 406 the tool to view a dependency details pane 232 which shows class(es) and call(s) for a list of dependencies and/or other relationships between software source code implementation components 120. The components are represented by design elements 126 displayed by the tool 420 in the display device.

In some embodiments, the method also includes using 412 the tool to mark a dependency for removal and to view 410 the updated work list. In particular, a user may use the tool to compare a pre-removal dependency call list (a call list in effect before the beginning of removal of a dependency by changing instances in code) with a post-removal dependency call list, thereby assessing progress of the dependency removal.

In some embodiments, the method also includes using 416 the tool to facilitate tracing impact of a work list task on at least one of the following parts of a project context 128: testing coverage, database structures, user requirements.

In some embodiments, the method also includes using 418 the tool to store the work list task in an association with the current design diagram. In some embodiments, the current design diagram is versioned and is stored by a version controller.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as work lists 216, tasks 218, enhanced diagrams 204, 210, and links 206, in the form of data 118 and instructions 116, read from a removable medium 114 and/or another source such as a network connection, to form a configured medium. The configured memory 112 is capable of causing a computer system to perform method steps for transforming data through engineering project change management as disclosed herein. FIGS. 1 through 4 thus help illustrate configured storage media embodiments and method embodiments, as well as system and method embodiments. In particular, any of the method steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

To illustrate some embodiments, consider the following scenario. A company wishes to refactor an existing application to move from an outdated data access structure to a new one. In this case, the company wants to introduce their own data access layer, rather than having user interface (UI) components call System.Data directly. This project involves a series of activities.

Some activities are directed to visualizing and analyzing the current architecture. One may identify which components make calls directly to System.Data, for instance. One may also assess how pervasive the dependencies 230 are. This assessment can be informed by getting dependency details 408 such as statistics for how many instances of System.Data classes are being created in the dependent component 120, how many calls are made to those instances, how many static calls are made, and how many sub classes are created of types in System.Data. One may also drill into component code to understand complexity levels. One may also seek to understand other data about the context 128 of involved components, such as test coverage, bug status, and so on.

Some activities are directed to designing the proposed architecture. One may try out potential refactoring, using 412 a tool 420 to mark which dependencies should be removed, which new components (e.g., classes) should be added, and how they should interact with old and new parts of the system. One may also review the impact of alternatives, for example, by understanding which code components 120 would be impacted, and as a result, which tests, scenarios or non-code artifacts of the context 128 would be impacted.

Some activities are directed to planning work. Using the new design and the knowledge about the existing structure (reflected in diagrams 204, 210, for instance), one may decide which refactoring is practically possible, given the potential impact on components 120 and their context 128. One may use a tool 420 to capture in tasks 218 the work required to realize the new design. Managers and developers may then plan the work, communicate the work, and track work as progress is made toward the new architecture.

We now consider in more detail how one may use an enhanced system 102 to work through the foregoing scenario.

With regard to visualizing and analyzing current architecture, in some embodiments the system has the ability to create design diagrams 204, 210 that are tied to code components 120, meaning that a model element 126 such as a class or component element can be traced to corresponding element(s) in code. In some embodiments, the system has the ability to detect in code both simple and complex relationships. By simple relationships, we mean that the source of the relationship is defined by a single attribute, which can either indicate a relationship or not, for example the references collection of a project. Such a relationship can be discovered and changed simply by accessing that one location. By complex relationships we mean that the source of a relationship can be found in multiple places, for example a class which has multiple locations the code that has calls from this class to another, thus making the class dependent on the other. Such relationships may be harder to detect and change, since they involve finding the source locations and then making multiple changes.

With regard to drilling into underlying data from the design diagram, in some embodiments by clicking on relationships in the diagram 204, 210, the user can get summarized information about the underlying code, such as number of calls, type of calls, and so on. For example, on a dependency 230 between two components, the system can show how many actual calls make up the dependency, what type of calls they are, and similar data. In some embodiments, the user is able to inspect the underlying data for elements and relationships. For example, the user is able to click on a complex relationship such as a dependency 230 between two components and get a list of the actual calls that make up the relationship. A details pane 232 shows the actual classes, calls, instances, static calls and so on that are involved, allowing the user to drill down to code when desired. In some embodiments, the user can select individual elements in the dependency details list and add comments and tags, and add them to a work list 216.

With regard to expressing and capturing design intent, in some embodiments the user is able to change a copy of the current diagram 204 to indicate the desired future design, in the form of a proposed design diagram 210. Operations to Create, Update and Delete elements are supported, as well as operations to express design intent more clearly. For examples, in some embodiments a user can use a tool 420 to mark a dependency for removal; this will mark the dependency in the diagram. In some embodiments a user can use a tool 420 to apply a refactoring pattern; this will mark any existing items in the diagram that need to be changed or removed, as well as add new elements to the diagram as necessary.

With regard to the work list 216, in some embodiments when the user takes actions on the diagram, the changes can be reflected in a separate pane in a work list showing the classes, calls, and so on which would be affected by the change. The work list identifies the affected code elements and adds data to each element to describe what action should be taken on it, in human readable form. The data may be descriptive enough for a developer to find the affected code locations and understand what needs to happen to them.

It is not a requirement that the work list 216 be automatically executed. Although in some cases the user getting the work list may be able to perform fully or partially automatic actions to achieve the captured intent, the work list 216 is meant to inform the user so that the user can take the appropriate action(s).

In some embodiments, the work list task 218 reflects the intent expressed in the model. Fields or tags that describe the intent, for example, in a change category 220 may indicate an intent to Remove, to Refactor to a pattern, to Refactor from a pattern to another pattern, to Refactor away from a pattern, or to Add. Longer descriptions, explaining more complex changes may also be provided. Tasks 218 also include a reference 222 to a code element, test or other development artifact that would be affected by the change. In some embodiments, a reference may refer to one of the following code elements: Solution, Component, Namespace, Project, Assembly, Class, Method, Call, Block of code, Line of code. Tasks 218 may also include Tracking information, such as Status, Owner.

The following are examples of tasks 218 in one embodiment, assuming that a dependency between LoanCreationUI and System.Data was marked as unwanted:
Task One
Action: Remove Dependency
Model elements: LoanCreation Depends on System.Data
Status: Not started
Owner: Not yet assigned
Class: LoanCreationUI.Customer
Caller: AddCustomer
Type: Instance
Called: System.Data.Dataset
Task Two
Action: Remove Dependency
Model elements: LoanCreation Depends on System.Data
Status: Not started
Owner: Not yet assigned
Class: LoanCreationUI.Customer
Caller: AddCustomer
Type: Instance Call
Called: Dataset.Fillby With regard to generating 306 the work list, in some embodiments, a work list 216 can be generated in a number of ways. Some embodiments provide explicit actions in a modeling tool for creating work list content, and some provide general tracking of generic modeling tool actions, for example. One approach is to generate 306 the list based on tracked actions, directly correlated to code. The system may generate the work list based on registered user actions. For example, assume the user takes an action on a selection of model elements. Each element can be traced back to code (or is newly added, in which case no code for the element exists). The action taken on the element or relationship will determine which of the traced code elements are actually affected. The affected code elements are put in the work list 216, together with change category 220 information about the action taken, e.g., mark for removal, refactor to pattern x, and so on. For example, if the user has issued a command to refactor a class using the pattern 'extract a method' the affected class and method will be added to the work list 216, as well as other calls to the method that need to be updated to target its new location. This work list modification may happen concurrently with design activity, meaning that the work list is constantly updated, or work list modification may occur as a batch operation, where captured actions are processed as batch, and the work list is generated as a batch.

Another approach is to generate 306 the work list 216 based on model differences, traced back to code. In some embodiments, the system generates a diff between a starting model diagram and a current model diagram. Each element that is different between the two versions is traced back to code. The affected code elements are added to the work list, annotated with the model difference that affects each of them.

Another approach is to generate 306 the work list 216 based on tracked actions, traced to code in the end. In some embodiments, the system tracks all changes to the model diagram, capturing which commands are issued and which model elements are involved. When the user decides to generate the work list, the changes are traced to code. The affected code elements are added to the work list, annotated with the model gesture that affected each of them.

Additional approaches can also be used in some embodiments to generate 306 a work list. For example, one approach includes manually adding to the list from the details pane. The user may go to the details pane, which shows which code elements are associated with a model element, then mark ones that should be added to the work list, annotating each with what should happen to it. One approach involves manually adding to the work list with special commands. The user decides which diagram actions are added to the work list. In one approach, the work list may also be generated based on differences between the actual code and the current state of the model. In one approach, the work list may be generated using a combination of the techniques described above, where some elements are added to the list based directly on gestures such as applying a refactoring pattern, while others are generated based on another technique.

With regard to saving and retrieving the work list, in some embodiments the work list is stored in a way that keeps it associated with the model. Users can use a tool 420 to retrieve the work list by opening the model and issuing a command to view work list. The saved work list contains the line item tasks 218 like those described above. The saved work list also has the information used to generate the list, such as the model change and the traces (e.g., links 206) to affected code.

In some embodiments, the user may compare the current work list to the current state of the code, by re-running the work list generation for a given change. The system will generate a new list of items affected by the change. The user can then compare the existing work list with the new run, to assess progress. For example, if the change was to remove a dependency between classA and ClassB, the user can use 414 a tool 420 to compare the original list of calls from A to B with the new list of calls from A to B.

With regard to using the work list to track work, in some embodiments the work list allows the user to set status on each line item (each task 218), as well as assign the task to a person. Combined with the ability to save the work list with the model, this tracking information supports a fluent transition from analysis and design to actual implementation. The information generated during analysis and design flows directly into the implementation phase. As work progresses on the work list, the user can update status on the item, so that the team can track the progress on the work, how far along it is, and eventually, when it is done.

With regard to additional aspects, some embodiments support integration with other tracking and planning tools. In particular, the work list 216 allows integration with other tracking and planning tools. One may create links from the work list to items in a work tracking tool 132, and from the work tracking tool to the work list items. The work list allows the user to select line items and create an associated work item to track the work. The user can select one or more items in the work list and issue commands such as: Add work item, Link to a work item, and View associated work items. In some embodiments, the user can navigate from a work list to the work items linked to the list 216, thus allowing teams that already use a work tracking system to utilize the tool 420 to track items in the work list. In some embodiments, the user can navigate from the work item to the work list or items in that list. The model (diagram 204 and/or diagram 210) can be reached using a link to the versioned model files in a version control system. The work list can be reached through the model. The work list items (tasks 218) can be reached through the work list. The code can be reached through the work list items. For the person being assigned the work item, the work item's link to the model and the work list allows him or her to get the context of the change, as well as a detailed list of which context areas will be impacted in code, test and other artifacts.

With regard to understanding the impact of proposed changes on tests, databases and other non-code assets in a project context 128, in some embodiments the system allows the user to run deeper analysis and capture other items than code items that are affected by a change in the work list.

As to test effect, for example, code elements can be traced to data for test coverage for the affected code. Low test coverage would indicate that a break in the functionality as a result of the architectural change may go undetected. Code elements can be traced to which test cases are exercising the affected code using Team Engineering tools (such as the so-called 'Aftershock' tool of the Microsoft Visual Studio® 2010 IDE), so testing can be focused to make sure that these test cases are run. In addition, this may indicate the need to update tests, which will add to the work of the change. Test cases in need of change can be added to the work list as affected elements.

As to effects on database(s), for example, in some embodiments model changes that change data structures can be traced through the code to the database assets that would be affected. As a result, work list entries describing the work to update the database can be generated.

As to effects on user scenarios, for example, in some embodiments code elements can be traced to tasks through Microsoft® Team Foundation Server change sets, and tasks can be traced to use scenarios, use cases, user requirements and so on, depending on the methodology used. Thus, the effect of the change on scenarios can be assessed.

Consider now the following scenario, to further illustrate some embodiments. A User Story includes a GlobalBank LoanOrigination system problem, namely, data access code is interlaced with business logic in UI components, which leads to data errors and bad performance from data providers. A project goal is to evaluate the feasibility of introducing a data access component to streamline data access.

An embodiment includes, in this example, a Microsoft Development Environment tool 420, with main menu items File, Edit, View, Project, Analyze, Design, Refactor, Debug, Tools, Window, Help. Also present are a Properties pane, and a Solution Explorer pane. The Solution Explorer pane shows "−LoanOrigination" as a heading above "+GBUIFramework, +LoanManagementUI, +LoanCreationUI, +LoanRestructuringUI, +LoanWorkflow, +LoanManagementTest, +LoanCreationTest, +LoanRestructuringTest". The user selects command Analyze|Show Dependency graph, causing the tool 420 to display a dependency graph, namely, a tree rooted at LoanOrigination.

The user selects command Analyze|Show External Dependency, causing the tool 420 to present a list containing System.Data, System.Diagnostics, and other dependencies, with a prompt to "Select the external dependency to view in diagram." The user selects System.Data, and a System.Data node is added to the displayed dependency graph.

The user next selects command Analyze|Group diagram by>|Layer . . . , causing the tool 420 to present a list containing ArchitecturalLayers1 and <New>, with a prompt to "Select the layer diagram you want to group by." The user selects <New>, and then from among offered alternatives "UI Layer Example", "Application Layer Example", and "Data Layer Example", the user selects a UI Layer Example, LoanManagementUI.prj. The tool reports six components of this selection involve Data Layer Example LoanDatabase. The tool 420 displays a dependency graph with arrows from UILayer to Data Layer and DataAccessLayer, and with an arrow from DataAccessLayer to Data Layer.

The user selects the arrow from UILayer: 6 components to Data Layer: LoanDatabase and the tool 420 displays a menu offering Hide from this diagram, Mark as unwanted. The user selects Mark as unwanted, causing the tool to mark dependencies for removal.

The user next selects command Refactor|Show code changes, causing the tool 420 to offer a work list window titled "Project" and containing "LoanCreationUI" and other projects. The user selects LoanCreationUI and views a work list 216 with tasks 218 including task data Project, Class, Caller, Type, Called, Action, Detail. One task is Project: LoanCreation, Class: Customer, Caller: AddCustomer, Type: Instance, Called: Dataset, Action: Ignore, Detail: Dim d as dataset=new dataset. Although tasks 218 are described herein textually, they can be presented in a GUI, or another interface.

The user next selects command Refactor|View Selection in Assembly Diagram, causing the tool 420 to display an assembly diagram showing a node for LoanCreationUI: ASP.NetWebApplication with an arrow to System.Data: WindowsApplication, a node for LoanManagementUI: WindowsApplication with an arrow to the System.Data node and another arrow to a node for LoanWorkflow: WindowsApplication, and a node for LoanRestructuringUI: WindowsApplication with an arrow to the System.Data node.

The user selects a metrics icon, and is prompted to Select metrics to view in diagram. Offered metrics are Code Coverage, Bug Status, Number of tests, Task status, Code churn. The user selects Code Coverage, causing the nodes other than the System.Data node to display Code coverage percentages. The tool 420 auto-detects a dependency from the node for LoanCreationUI: ASP.NetWebApplication to System.Data: WindowsApplication, and indicates this in the display. Statistics displayed recite: Auto-detected dependency, Referenced: Yes, Instances: 32, Instance calls: 200, Static calls: 12, Subclasses: 3, More . . . Selecting More leads to the work list 216.

The user creates a work item (task 218) to "Remove call from LoanCreation.Customer.GetCustomer to System.Data", with links 206 to AssemblyDiagram1 \\LoanOrigination\LoanCreation\Customer.cs line 42, AssemblyDiagram1 \\LoanOrigination\LoanCreation\Customer.cs line 56, AssemblyDiagramChanges.dqml.

After returning to the assembly diagram, the user next selects command Refactor|View Selection in Class Diagram, causing the tool 420 to display a class diagram with nodes for LoanCreationForm and other classes. The tool 420 permits the user to navigate from an arrow connecting class nodes to the work list 216. The user selects a command to Create Sequence Diagram, views the tool-generated sequence diagram, adds a Life Line, makes other sequence diagram modifications, and again is able to navigate to the work list 216, where the user creates a task 218.

Some embodiments are integrated with Layer diagrams, Class diagrams, and/or Refactoring support. Refactoring models may include separating data access code, extracting a class, and/or extracting a method, for example. Support for refactoring from a diagram may include marking changes with a desired pattern or model, and integrating with code refactoring providers to run refactoring.

Some embodiments include and/or extend functionality described in U.S. patent application Ser. No. 12/132,050 filed 3 Jun. 2008, which is incorporated herein by reference.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3 and 4 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer-readable storage medium, which is not a signal, configured with data and instructions for performing a method for managing changes in an engineering project, the method comprising the steps of:

displaying a current design diagram in a computer system display device, the current design diagram representing a current design of an engineering project, the current design diagram including at least two design elements, each of these design elements having a visual representation in the display device, each of these design elements also having a link to at least one respective implementation component;

displaying a proposed design diagram in the display device, the proposed design diagram representing a proposed design of the engineering project and versioned separately from the current design diagram, which allows both versions to reside separately in the display device at the same time, the proposed design diagram including at least one proposed design element not present in the current design diagram, the proposed design element having a visual representation in the display device; and generating a work list in a computer system memory, the work list including specific tasks for transforming the current design into the proposed design of the engineering project, as opposed to including all tasks from design creation to the current design, wherein the work list comprises a refactoring task for refactoring with at least one of the following implementation components: a software namespace, a software class, a software method, a software call, a block of software code, a software source code component, wherein the transforming comprises visualizing and analyzing the current design for detecting both simple and complex relationships of the implementation components, and at least one task of the work list has a change category summarizing an intended change to be made to the current design, and also has a reference to at least one of: an implementation component which is to be changed as indicated in the change category, a design element which is to be changed as indicated in the change category, the at least one task also having tracking information which includes a task status of the intended change to the referenced component, namely, the intended change is unassigned, the intended change is assigned, the intended change is underway, the intended change is tested, or the intended change is completed.

2. The configured medium of claim 1, wherein the generating step comprises:

automatically identifying a design element difference between the current design diagram and the proposed design diagram;

automatically tracing a link for the design element difference to a software source code implementation component; and automatically adding a work list task which has a change category based at least on the design element difference and also has a reference to the software source code implementation component;

whereby the work list task is based on model differences correlated with project code.

3. The configured medium of claim 1, wherein the generating step comprises:

receiving a user selection of a design element of the current design diagram;

accepting a user command to alter the selected design element;

automatically tracing a link for the design element to a software source code implementation component; and automatically adding a work list task which has a change category based at least on the user command and also has a reference to the software source code implementation component;

whereby the work list task is based on tracked user design actions correlated with project code.

4. The configured medium of claim 1, wherein the generating step comprises receiving and responding to user gestures, whereby the work list task is added manually.

5. The configured medium of claim 1, wherein the method further comprises updating the task status in response to a user action.

6. The configured medium of claim 1, wherein the method further comprises exporting a work list task to a work tracking tool which did not generate the work list task.

7. The configured medium of claim 1, wherein the method further comprises storing in a persistent memory a work list task including at least the following: a change category, a reference to a software source code implementation component which is to be changed as indicated in the change category, a status, a task owner.

8. A method for using a tool for managing changes in an engineering project, the method comprising the steps of:

using the tool to view a current design diagram in a computer system display device, the current design diagram representing a current design of an engineering project, the current design diagram including at least two design elements, each of these design elements having a visual representation in the display device, each of these design elements also having a link to at least one respective implementation component, the implementation components being at least two of the following: a software namespace, a software class, a software method, a software call, a block of software code, a line of software code, a software source code component, a hardware circuit diagram;

using the tool to modify a proposed design diagram in the display device, the proposed design diagram representing a proposed design of the engineering project and versioned separately from the current design diagram, which allows both versions to reside separately in the display device at the same time, the proposed design diagram including at least one proposed design element not present in the current design diagram, the proposed design element having a visual representation in the display device;

using the tool to view at least one detail of a relationship between software source code implementation components; and using the tool to view a work list in the display device, the work list including specific tasks for transforming the current design into the proposed design of the engineering project, as opposed to including all tasks from design creation to the current design, wherein the work list comprises a refactoring task for refactoring with at least one of the following implementation components: a software namespace, a software class, a software method, a software call, a block of software code, a software source code component, wherein the transforming comprises visualizing and analyzing the current design for detecting both simple and complex relationships of the implementation components, and wherein at least one task of the work list has tracking information which includes a task status of an intended change to a referenced implementation component, namely, the intended change is unassigned, the intended change is assigned, the intended change is underway, the intended change is tested, or the intended change is completed.

9. The method of claim 8, further comprising using the tool to view a dependency details pane which shows a class and an expression within the class which depends on the other component for all or part of its execution, for a dependency between software source code implementation components, the components represented by design elements displayed by the tool in the display device.

10. The method of claim 8, further comprising using the tool to mark a relationship for removal and to view a corresponding updated work list.

11. The method of claim 8, further comprising using the tool to track progress by comparing a pre-removal dependency call list with a post-removal dependency call list, thereby assessing progress toward the proposed design.

12. The method of claim 8, further comprising using the tool to facilitate tracing impact of a work list task on at least one of the following parts of a project context: testing coverage, database structures, user requirements.

13. The method of claim 8, further comprising using the tool to store the work list task in an association with the current design diagram, wherein the current design diagram is versioned and is stored by a version controller.

14. A system comprising:
at least one logical processor;
a memory in operable communication with the at least one logical processor;
a display device;
implementation components which encode in a portion of the memory implementation details of a current implementation of an engineering project, the implementation components comprising at least two of the following: a software namespace, a software class, a software method, a software call, a block of software code, a line of software code, a software source code component, a hardware circuit diagram;
a current design diagram residing in a current design diagram portion of the memory, the current design diagram representing a current design of the engineering project, the current design diagram including at least two design elements, each of these design elements having a visual representation in the display device, each of these design elements also having a link to at least one implementation component;
a proposed design diagram also residing in the memory, namely, residing in a proposed design diagram portion of the memory, the proposed design diagram representing a proposed design of the engineering project and versioned separately from the current design diagram, which allows both versions to reside separately in the display device at the same time; and
a work list in a portion of the memory, the work list including specific tasks for transforming the current design into the proposed design of the engineering project, as opposed to including all tasks from design creation to the current design, wherein the transforming comprises visualizing and analyzing the current design for detecting both simple and complex relationships of the implementation components, wherein the work list comprises a refactoring task for refactoring with at least one of the following implementation components: a software namespace, a software class, a software method, a software call, a block of software code, a software source code component, and wherein at least one task of the worklist has tracking information which includes a task status of an intended change to a referenced implementation component, namely, the intended change is unassigned, the intended change is assigned, the intended change is underway, the intended change is tested, or the intended change is completed.

15. The system of claim 14, wherein a task of the work list comprises a change category summarizing an intended change to be made to the current design, and a reference to at least one of: an implementation component which is to be changed as indicated in the change category, a design element which is to be changed as indicated in the change category.

16. The system of claim 15, wherein the change category indicates at least one of the following should be done with the implementation component: remove, refactor, add.

17. The system of claim 15, wherein another implementation component includes at least one of the following: software component, project, assembly.

18. The system of claim 14, wherein the tracking information further includes task owner.

19. The system of claim 14, wherein the implementation components comprise at least one of: a software source code component, a hardware circuit diagram.

20. The system of claim 14, wherein the design elements comprise a Unified Modeling Language model diagram element.

* * * * *